United States Patent [19]
Tanaka et al.

[11] 3,911,759
[45] Oct. 14, 1975

[54] STEERING APPARATUS FOR VEHICLES

[75] Inventors: Yutaka Tanaka; Masakatsu Nonaka, both of Toyota, Japan

[73] Assignee: Toyota Jidosha Kogyo Kabushiki Kaisha, Toyota, Japan

[22] Filed: July 3, 1973

[21] Appl. No.: 376,164

[30] Foreign Application Priority Data
July 18, 1972  Japan.............................. 47-71874

[52] U.S. Cl....................... 74/492; 64/9 R; 188/1 C
[51] Int. Cl.²...................... B62D 1/18; F16D 9/00
[58] Field of Search.......... 74/492, 493; 64/9 R, 14; 188/1 C

[56] References Cited
UNITED STATES PATENTS

| | | | |
|---|---|---|---|
| 2,409,062 | 10/1946 | Oliver | 74/492 X |
| 3,329,040 | 7/1967 | Stein | 74/493 |
| 3,401,576 | 9/1968 | Eckels | 74/493 |
| 3,424,263 | 1/1969 | Black | 74/492 X |
| 3,552,145 | 1/1971 | Barton et al. | 64/14 |
| 3,597,994 | 8/1971 | Shiomi et al. | 74/492 |
| 3,699,824 | 10/1972 | Staudenmayer | 74/492 |

FOREIGN PATENTS OR APPLICATIONS
1,269,907   6/1968   Germany .............................. 74/492

*Primary Examiner*—Allan D. Herrmann
*Attorney, Agent, or Firm*—Stevens, Davis, Miller & Mosher

[57] ABSTRACT

A steering apparatus comprising an axially retractable steering shaft assembly connected at its lower and upper ends respectively to a steering gear of a vehicle and to a steering wheel of the vehicle and a column tube mounted on a portion of the vehicle and surrounding the steering shaft assembly coaxially therewith for journalling the steering shaft assembly. The column tube is separated at a predetermined distance from a toe-board of the vehicle at its lower end and the steering shaft assembly includes a breakable joint located within the column tube, the joint being broken only radially by twisting and/or bending moments exerted on the steering shaft assembly in a vehicle collision.

9 Claims, 13 Drawing Figures

3,911,759

STEERING APPARATUS FOR VEHICLES

BACKGROUND OF THE INVENTION

The present invention relates to a steering apparatus of a vehicle, and more particularly to an improvement of the steering apparatus provided with an impact energy absorbing device.

There have been introduced various impact energy absorbing devices for a steering apparatus to protect the operator of the vehicle from injury during a vehicle collision. For an example, disclosed in U.S. Pat. No. 3,597,994 is an impact energy absorbing device which comprises an axially retractable steering shaft assembly connected at its upper and lower ends respectively to a steering wheel and to a steering gear, an axially retractable tubular steering column assembly coaxially surrounding and journalling the steering shaft assembly, and an impact energy absorbing member plastically deformable only in the forward or downward direction for supporting the steering column assembly on a portion of the vehicle therethrough.

As the tubular steering column assembly is mounted at its lower end on a toe-board of the vehicle, there have been found such problems as the impact energy absorbing member being pushed upward by a twisting or bending moment caused by the big displacement of the steering gear toward the vehicle compartment during a vehicle collision. The bending or twisting moment is also produced by the secondary impact energy given to the steering wheel diagonally from the backward impact energy by the operator in the vehicle collision. Thus, the tubular steering column assembly may be prevented from its axial displacement in the secondary impact energy absorbing operation. In other words, with the mentioned type of impact energy absorbing device, the secondary impact energy may not be absorbed as it should be or the safety operation is remarkably disabled by influence of the first impact energy.

SUMMARY OF THE INVENTION

The primary object of the present invention is, therefore, to provide a steering apparatus of a vehicle wherein the secondary impact energy can smoothly be absorbed to protect the operator during a vehicle collision even if there is any moment acting on the steering shaft assembly by the steering gear in the first impact.

Another object of the present invention is to provide a steering apparatus of a vehicle wherein the undesired influence of the first impact energy is disabled by breakage of the steering shaft assembly within the column tube assembly.

A further object of the present invention is to provide a steering apparatus wherein a column tube for coaxially surrounding and journalling the steering shaft assembly is separated at a given distance from a toe-board of the vehicle.

Still another object of the present invention is to provide a steering apparatus wherein the secondary impact energy can be absorbed by an impact energy absorbing member capable of plastic deformation in one direction only under the downward tension, which is interposed between the column tube and a portion of the vehicle by way of a pedal bracket which may also absorb the secondary impact energy when deflected upwardly with the column tube.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENT

Figure 1:
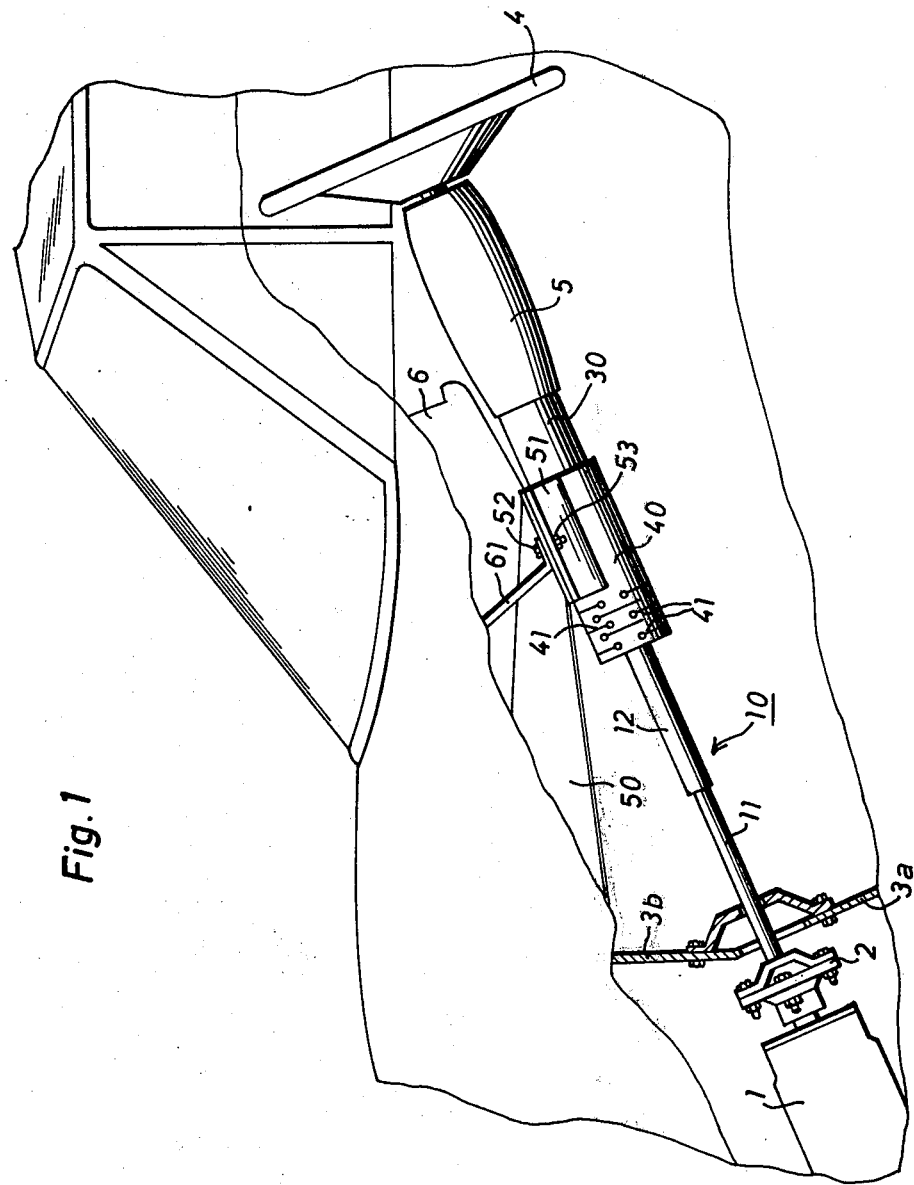
FIG. 1 shows an elevational side view of a steering wheel device provided with an embodiment of the safety device in accordance with the present invention.
Figure 2:
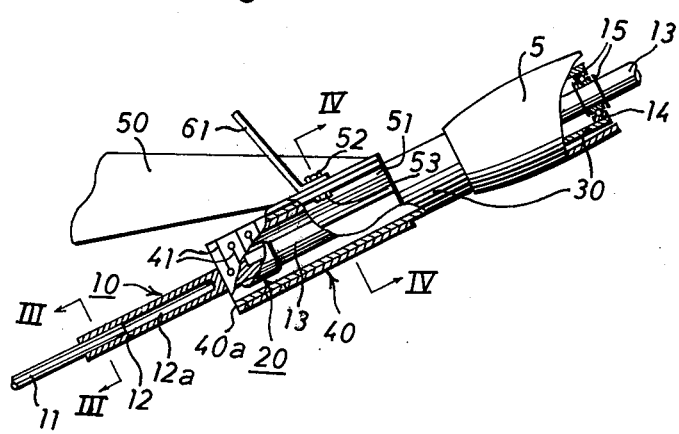
FIG. 2 is a partially broken side view corresponding to FIG. 1.

Referring now to the drawings, more particularly to FIGS. 1 and 2, there is shown an embodiment of a steering wheel device in accordance with the present invention. The steering wheel device includes a steering shaft assembly 10 which comprises a lower shaft 11 coaxially connected with a middle shaft 12 to be retractable only along the axial line thereof. The middle shaft 12 is in connection with an upper shaft 13 through a breakable joint 20. As best shown in FIG. 1, the lower end of the lower shaft 11 extends downward through a toe-board 3a and is connected to a steering gear 1 of the vehicle by way of a conventional flexible coupling 2.

Figure 3:
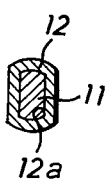
FIG. 3 is an enlarged cross-sectional view taken along line III — III in FIG. 2.

As it is clear in FIGS. 2 and 3, the upper end of the lower shaft 11 has a substantially rectangular cross section which is coupled axially slidably in a cylindrical bore 12a correspondingly provided within the lower end of the middle shaft 12. The upper shaft 13 is contained within a column tube 30, wherein the shaft 13 is rotatably journalled in ball bearings 14 at the upper end of the column tube 30. Snap rings 15 radially mounted in the column tube 30 are to hold the bearings 14 in the position therefor and to prevent the shaft 13 from its axial displacement. A steering wheel 4 is secured on the top end of the upper shaft 13.

Figure 5:
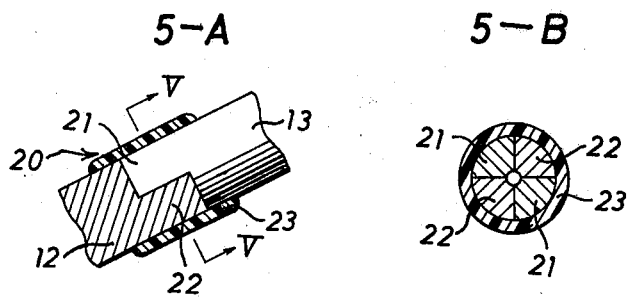
In FIG. 5, FIG. 5-A illustrates an enlarged elevational cross-section of a breakable jointing portion shown in FIG. 2 and FIG. 5-B is a cross-sectional view taken along line V — V in FIG. 5-A.

With reference to FIG. 5, the breakable joint 20 connecting the upper and middle shafts 13 and 12 comprises a pair of first jointing portions 21 provided on the lower end of the upper shaft 13 and a pair of second jointing portions 22 provided on the top end of the middle shaft 12, the first and second jointing portions 21 and 22 having approximate sector cross-sections corresponding to each other. The breakable joint 20 further includes a jointing ring 23 made of breakable synthetic resin. This jointing ring 23 is coupled over the first and second jointing portions 21 and 22 in mutual engagement. Thus, the rotation of the upper shaft 13 by the steering wheel 4 can be transmitted to the middle shaft 12 by way of the engaging faces of the first and second jointing portions 21 and 22. The joint 20 is breakable within the column tube 30 by a twisting moment acting radially on the shaft assembly 10.

Figure 4:
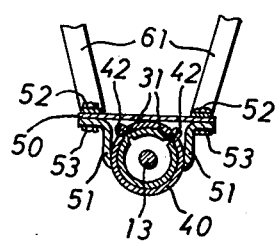
FIG. 4 is a cross-sectional view taken along line IV — IV in FIG. 2.

Described hereinafter with reference to FIGS. 1, 2 and 4 is an example of supporting construction to install the upper portion of the shaft assembly 10 on a portion of the vehicle. The supporting construction comprises an impact energy absorbing member 40 of a cylindrical shape of which the lower end is secured on the lower portion of the column tube 30 and a pedal bracket 50 firmly supports the upper portion of the energy absorbing member 40 by way of brackets 51. The cylindrical impact energy absorbing member 40 is loosely coupled over the lower outer periphery of the column tube 30 and the lower inner wall thereof is welded on the lower outer periphery of the column tube 30 as indicated by reference numeral 40a. The upper portion of the energy absorbing member 40 is at its both sides welded with the brackets 51 50a. (See FIG. 4) This energy absorbing member 40 is provided with a plurality of closed slits 41 transverse of the axis of the shaft assembly 10 at a right angle. As is well illustrated in FIG. 4, at the loosely engaged portion of the column tube 30 and the energy absorbing member 40, provided are a pair of projections 31 longitudinally bossed from the outer periphery of the column tube 30 and a pair of grooves 42 axially provided on the inner periphery of the energy absorbing member 40 to have the projections 31 engaged therein.

The pedal bracket 50 is secured at its forward end firmly on a fire wall 3b under the instrument panel 6 and extends backward toward the energy absorbing member 40. A pair of struts 61 are secured at their upper ends on a cowl panel (not shown) for supporting the instrument panel 6. The lower ends of the struts 61 and the rear end of the pedal bracket 50 are fastened together by bolts 52 and nuts 53 with the flanges of the brackets 51 which are welded at the other ends thereof on the energy absorbing member 40.

Because of the construction described heretofore, when a forward or downward impact load is given to the column tube 30, the column tube 30 displaces forwardly or downwardly and the closed slits 41 of the energy absorbing member 40 are expandingly opened, whereby the pulling force produced in deformation of the slits 41 acts to absorb the impact energy. The column tube 30 has a column cover 5 which will be broken by the displacement of the column tube 30.

Described in detail hereinafter is the operation of the device in accordance with the present invention. While the vehicle is normally traveling, various road conditions may give oscillations and vibrations to the gear box 1 and accordingly some twisting and bending moments may act on the steering shaft assembly 10. In this instance, the given twisting moment is received by the pedal bracket 50 and the breakable joint 20 for the middle and upper shafts 12 and 13 is not broken by the twisting moment.

During a vehicle collision, when the gear box 1 may have a big displacement toward the vehicle compartment, the lower shaft 11 slides upward within the bore 12a of the middle shaft 12 and at the same time, twisting and bending moments act on the whole construction of the steering shaft assembly 10. In this instance, when the twisting and bending moments exceed a predetermined value, the connecting ring 23 of the breakable joint 20 is broken to separate the middle shaft 12 from the upper shaft 13, thereby the impact energy and/or the twisting and bending moments produced by the first impact are not transmitted to the column tube 30. When the joint 20 is broken, the middle shaft 12 separated from the upper shaft 13 will remain within the column tube 30 and never juts out of the column tube 30 and there is no worry that the occupant of the vehicle will be hurt in the mentioned first impact energy absorbing operation.

Figure 9:
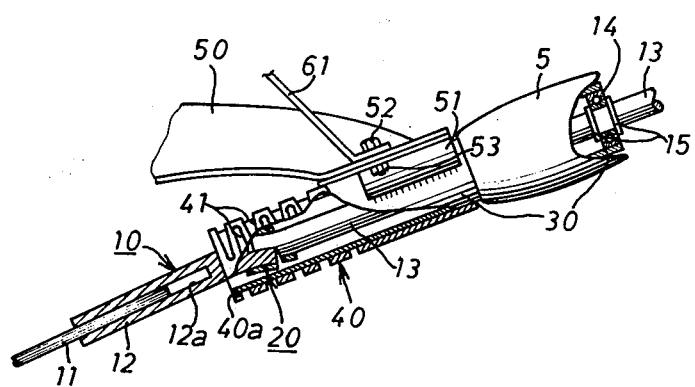
FIG. 9 is a view similar to FIG. 2 illustrating the apparatus after a vehicle collision.

When a second impact energy is produced toward the steering wheel 4 by the occupant who is pushed forward during the occurrence of the first impact energy, the second impact energy given to the steering wheel 4 is transmitted to the column tube 30 by way of the upper shaft 13, the snap rings 15 and the bearings 14. When this second impact energy exceeds a predetermined value, the closed slits 41 of the impact energy absorbing member 40 are expandingly opened to absorb the second impact energy as shown in FIG. 9. Simultaneously, the column tube 30 slides forwardly within the impact energy absorbing member 40. Furthermore, the twisting and bending moments by the impact load from the occupant makes the pedal bracket 50 turn up due to the weak stiffness of the fire wall 3b supporting the pedal bracket 50 and the reduction of the stiffness of the vehicle body caused by the rearward projection of the vehicle engine, whereby this second impact energy is well absorbed.

Figure 6:
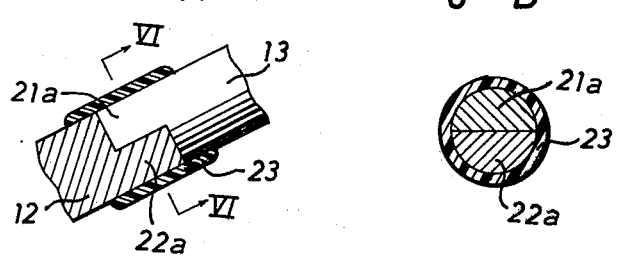
FIGS. 6, 7 and 8 show other embodiments of the jointing portion shown in FIG. 5, wherein FIG. 6-B, FIG. 7-B and 8-B show respectively cross-sectional views taken along lines VI — VI, VII — VII and VIII — VIII in FIGS. 6-A, 7-A and 8-A.

A second example of the breakable joint 20 is illustrated in FIG. 6, wherein the upper shaft 13 has at the lower end thereof a jointing portion 21a having a half circle cross-section and the middle shaft 12 has at the top end thereof a corresponding jointing portion 22a having a half circle cross-section. Then, the synthetic resin jointing ring 23 is coupled over the engaged jointing portions 21a and 22a.

Figure 7:
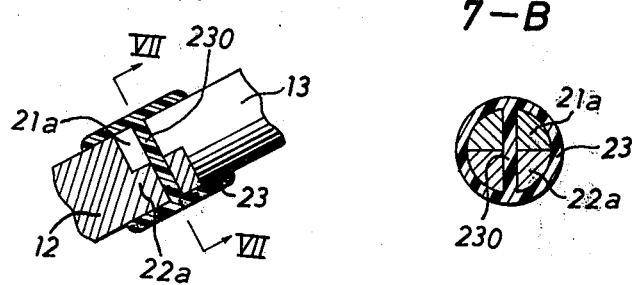

Now reference is made to FIG. 7 for a third example of the breakable joint 20, wherein the jointing portions 21a and 22a respectively of the upper and middle shafts 13 and 12 are formed as disclosed in FIG. 6. And after these portions 21a and 22a are engaged, a shearable pin 230 is formed integrally with the ring 23 to maintain the engagement of the jointing portions 21a and 22a.

Figure 8:
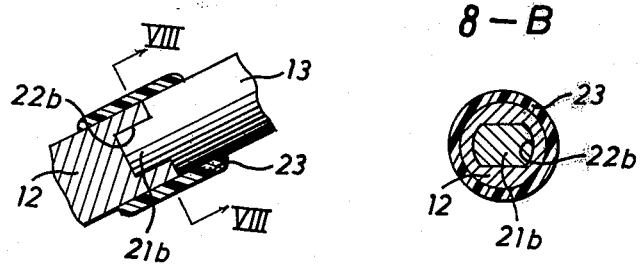

FIG. 8 illustrates a fourth example of the breakable joint 20. The lower end of the upper shaft 13 is formed in a jointing portion 21b having an approximate square cross-section and the top end of the middle shaft 12 has a jointing portion 22b drilled therein in a shape corresponding to the jointing portion 21b of the upper shaft 13. The projecting jointing portion 21b is engaged into the indented jointing portion 22b and the engagement is maintained by a breakable synthetic resin connecting ring 23.

In the embodiment mentioned heretofore, the lower shaft 11 and the lower portion of the middle shaft 12 are exposed out of the column tube 30 and have no cover therefor. It is, however, desirable to cover up the lower shaft 11 and the lower portion of the middle shaft 12 with a flexible synthetic resin cover member.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. A mechanism for a vehicle including a steering gear; a steering wheel; an axially retractable steering shaft assembly; and a column tube mounted on a portion of the vehicle and surrounding said shaft assembly coaxially therewith for rotatably journalling said steering shaft assembly, wherein said column tube is separated at a predetermined distance from a toe-board of the vehicle at its lower end, wherein said steering shaft assembly includes a breakable jointing means located within said column tube, a lower shaft connected at its lower end to said steering gear, an upper shaft connected at its upper end to said steering wheel and a middle shaft connected retractably at its lower end to the upper end of said lower shaft and separably at its upper end to the lower end of said upper shaft by way of said breakable jointing means within said column tube, and wherein said breakable jointing means comprises separable jointing portions provided between said upper and middle shafts and a breakable member coupled over said jointing portions for securing said upper and middle shafts in an integral relation, said jointing portions including engagement faces for torque transmission between said upper and middle shafts and said jointing means being broken only radially by twisting and/or bending moments exerted on said shaft assembly during vehicle collision.

2. A mechanism as set forth in claim 1, wherein said column tube is supported by an impact energy absorbing member of which the lower end is secured on a portion of said column tube and the upper end on a portion of the vehicle, said impact energy absorbing member being plastically deformable in one direction only by downward tension given thereon through said column tube while rigid in the opposite direction.

3. A mechanism as set forth in claim 2, wherein said impact energy absorbing member is a tubular member which is coaxially coupled over and secured at its lower end on said column tube and at the upper end thereof on a portion of the vehicle, said tubular member being provided with at least one closed slit substantially transverse of the axis of said steering shaft assembly and being opened wide by downward tension given to said column tube in a vehicle collision.

4. A mechanism as set forth in claim 3, wherein said tubular member is secured at its upper end thereof on the rear end of a longitudinal pedal bracket secured at the forward end thereof on a fire wall under an instrument panel of the vehicle.

5. A mechanism as set forth in claim 1, wherein said jointing portions of said breakable jointing means comprise a projection provided on the lower end of said upper shaft with a substantially rectangular cross-section and a corresponding indent provided on the upper end of said middle shaft.

6. A mechanism as set forth in claim 1, wherein said breakable member is made of synthetic resin.

7. A mechanism as set forth in claim 1, wherein said jointing portions of said breakable jointing means have substantially sector cross-sections respectively for forming said engagement faces.

8. A mechanism as set forth in claim 1, wherein said jointing portions of said breakable jointing means have half-circle cross-sections respectively for forming said engagement faces.

9. A mechanism as set forth im claim 8, wherein said breakable member includes an integrally shearable pin transversing said engagement faces of said jointing portions.

* * * * *